(12) United States Patent
Xu et al.

(10) Patent No.: US 10,032,365 B1
(45) Date of Patent: Jul. 24, 2018

(54) APPARATUS, SYSTEM AND METHOD FOR USING A UNIVERSAL CONTROLLING DEVICE FOR DISPLAYING A GRAPHICAL USER ELEMENT IN A DISPLAY DEVICE

(71) Applicant: Universal Electronics Inc., Santa Ana, CA (US)

(72) Inventors: Rex Xu, Foothill Ranch, CA (US); Jesus Perez, Costa Mesa, CA (US); Jon Gallegos, Huntington Beach, CA (US)

(73) Assignee: Universal Electronics Inc., Santa Ana, CA (US)

( * ) Notice: Subject to any disclaimer, the term of this patent is extended or adjusted under 35 U.S.C. 154(b) by 0 days.

(21) Appl. No.: 15/784,637

(22) Filed: Oct. 16, 2017

(51) Int. Cl.
*G08C 17/02* (2006.01)
*G06F 3/0488* (2013.01)

(52) U.S. Cl.
CPC ......... *G08C 17/02* (2013.01); *G06F 3/04886* (2013.01); *G08C 2201/32* (2013.01); *G08C 2201/42* (2013.01); *G08C 2201/92* (2013.01)

(58) Field of Classification Search
CPC ................ G08C 17/02; G08C 2201/32; G08C 2201/42; G08C 2201/92; G06F 3/04886
USPC .......................................................... 340/12.5
See application file for complete search history.

(56) References Cited

U.S. PATENT DOCUMENTS

| | | | |
|---|---|---|---|
| 9,395,754 B2 * | 7/2016 | Cronin | G06F 3/0484 |
| 2007/0038516 A1 * | 2/2007 | Apple | G06Q 30/02 |
| | | | 705/14.42 |
| 2007/0251997 A1 * | 11/2007 | Brown | G06K 7/0008 |
| | | | 235/380 |

\* cited by examiner

*Primary Examiner* — Allen T Cao
(74) *Attorney, Agent, or Firm* — Greenberg Traurig, LLP

(57) ABSTRACT

An apparatus, system and method is described for controlling one or more consumer electronic devices that is performed by a smart device in cooperation with a universal controlling device. The smart device causes a particular consumer electronic device template to be displayed to a user in response to receiving an indication of a particular key that was touched by the user on the universal controlling device. The template comprises one or more graphical elements, each for performing a particular operation in association with the particular consumer electronic device. The smart device then causes an action to be performed when the user selects one of the graphical elements by pressing one of the keys on the universal controlling device.

19 Claims, 6 Drawing Sheets

APPARATUS, SYSTEM AND METHOD FOR USING A UNIVERSAL CONTROLLING DEVICE FOR DISPLAYING A GRAPHICAL USER ELEMENT IN A DISPLAY DEVICE

BACKGROUND

Universal controlling devices, such as for example, remote control type devices which are configured to issue commands to a multiplicity of appliances of different type and/or manufacture, and the features and functionality provided by such controlling devices are well known in the art.

For commanding the operation of multiple appliances using a single universal controlling device, a conventional controlling device typically comprises multiple device mode states. In each device mode state, the universal controlling device is configured to command the operation of one or more designated appliances. For example, a typical universal remote control may be placed into one of the multiple device mode states through actuation of a corresponding device mode key. In this example, the user relies on the key labels to determine the proper device mode. The actuation of such a device mode key functions to configure the universal remote control to transmit command codes to the one or more appliances that have been designated to the device mode state corresponding to the actuated device mode key.

One drawback of such an arrangement is that is incumbent upon the user of the controlling device to be aware of, and if necessary reselect, an appropriate device mode state prior to issuing operating commands to each of the controlled appliances. All too frequently users may forget or overlook this step, resulting in an unintended action being performed by the wrong device.

A further shortcoming of such controlling devices is that users must always be looking at the input elements, for example keys on a universal remote control, may initiate different command functions in different device modes. The prevalence of such input key clutter is yet another source of user confusion. Therefore, it would be desirable to provide a universal controlling device that allows a user to navigate and control appliance functions without the input key clutter, mode confusion, and input key labels, thereby eliminating the need to look down at each input key label to perform the desired operation.

SUMMARY

Described hereinafter are examples of an apparatus, a system, and a method for controlling one or more consumer electronic devices with a universal controlling device. In one embodiment, a universal controlling device has functional components that comprise an electronic storage medium having processor-readable code embodied therein for storing a plurality of unique key ids where each unique key id is associated with a particular input key of the universal controlling device, input keys for receiving user input, a communication interface for sending unique key ids to a smart device and to a processor coupled to the electronic storage medium, the input keys, and the communication interface, for executing the processor-readable code.

In operation, the processor-readable code causes the processor to determine that an input key was touched by a user. In response to the processor determining that a first input key was touched, the processor sends, via the communication interface, a first unique key id associated with the touch of the input key that causes a consumer electronic device template associated with a first consumer electronic device to be displayed by the smart device, where the consumer electronic device template has the functional components that comprise a set of graphical user interface elements, where each graphical user interface element associated with a particular action of the consumer electronic device and where the processor determines that a second input key was pressed. In response to determining that the second input key was pressed, the processor sends via the communication interface, a second unique key id to the smart device, the second unique key id that causes a selection of a first graphical user interface element from the set of graphical user interface elements that causes the smart device to have the consumer electronic device perform the action associated with the first graphical user interface element.

In one embodiment, a smart device is described, coupled to a universal controlling device, for controlling one or more consumer electronic devices with a universal controlling device, comprising, an electronic storage medium having processor-readable code embodied therein for storing a plurality of consumer electronic device templates, where each template comprises a graphical representation of a set of actions available to a user to control a particular consumer electronic device, each graphical user interface element associated with one of the actions and further for storing operational commands each associated with one of the actions, the operational commands in conformity with a protocol used by a particular consumer electronic device associated with the template, a communication interface for receiving an input from the universal controlling device, and a processor that is coupled to the electronic storage medium and the communication interface for executing the processor-readable code.

In operation, the processor-readable code causes the processor to receive, via the communication interface, a first key id from the universal controlling device representative of a input key of the universal controlling device that was touched by the user, determine a first consumer electronic device template associated with the first key id from the plurality of consumer electronic device templates stored in the electronic storage medium, the first consumer electronic device template comprising a plurality of first graphical user interface elements associated with a particular consumer electronic device, cause the first consumer electronic device template to be displayed by a display device, receive, via the communication interface, a second key id from the universal controlling device representative of an input key of the universal controlling device that was pressed by the user, determine a first operational command associated with the second key id, and performing an action associated with the first operational command.

A method is described for controlling one or more consumer electronic devices that is performed by a smart device in cooperation with a universal controlling device, where a processor of the smart device receives, via a communication interface, a first key id from the universal controlling device. The smart device processor then determines a first consumer electronic device template from a plurality of consumer electronic templates stored in a memory where the first consumer electronic device template comprises a set of graphical user interface elements where each graphical user interface element is associated with an action of a particular consumer electronic device. The set of graphical user interface elements are then displayed on a display device and the smart device processor then receives, via the communication interface, a second key id from the universal controlling device where the second key id representative of a second key that was pressed by the user. The smart device processor then determines a first graphical user interface element from the set of displayed graphical user interface elements from the second key id and causes the consumer electronic device to perform an action associated with the first graphical user interface element.

In one embodiment, system for controlling one or more consumer electronic devices has functional components that comprise, a universal controlling device for receiving user input and for determining, that an input key was touched by a user, a smart device comprising an electronic storage medium having processor-readable code embodied therein for executing the processor-readable code.

In operation, the processor-readable code causes the processor to receive, via a communication interface, a first unique key id from the universal controlling device; determine, a first consumer electronic device template from a plurality of consumer electronic templates stored in a memory, the first consumer electronic device template comprising a set of graphical elements where each graphical element is associated with an action of a particular consumer electronic device; display the set of graphical elements on a display device; receive, via the communication interface, a second unique key id from the universal controlling device where the second unique key id representative of a second key that was pressed by the user; determine a first graphical element from the set of displayed graphical elements from the second unique key id and cause the consumer electronic device to perform an action associated with the first graphical element.

A better understanding of the objects, advantages, features, properties, and relationships of the invention will be obtained from the following detailed description and accompanying drawings which set forth illustrative embodiments and which are indicative of the various ways in which the principles of the invention may be employed.

BRIEF DESCRIPTION OF THE DRAWINGS

For a better understanding of the various aspects of the described systems and methods, reference may be had to the illustrative examples shown in the attached drawings in which.

DETAILED DESCRIPTION

Examples described hereinafter relate generally to embodiments of an apparatus, system and method for using a universal controlling device for controlling one or more consumer electronic devices.

Figure 1:
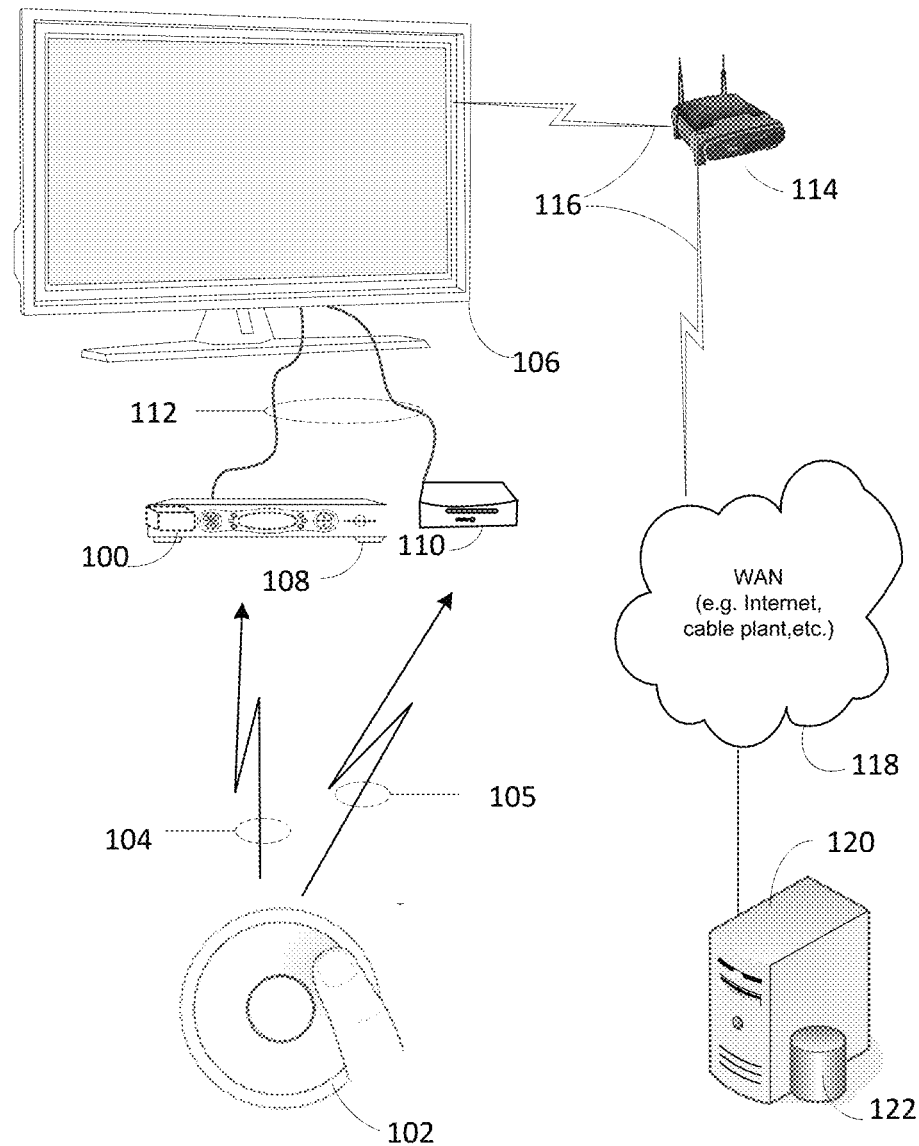
FIG. 1 is a block diagram illustrating one embodiment of a system for controlling one or more consumer electronic devices.

FIG. 1 illustrates an example system in accordance with the disclosure herein and includes a universal controlling device 102, operated to control the functional operations of one or more consumer electronic devices such as a COMCAST® brand, set-top-box 108, (hereafter referred to as "STB") and an APPLE® TV brand streamer 110 (hereinafter referred to as "streamer"). Some consumer devices are Internet-capable, i.e., they can send or receive content to and/or from sources located within range of a local data network, such as a wireless LAN, or sources located in remote locations via the Internet and may operate to some extent interactively and autonomously, (hereafter referred to as, "smart devices"). In this example, the universal controlling device 102, comprises input keys where each input key comprises one or more capacitive touch sensors, such as a capacitive sensing area that can detect and measure conductivity, (hereafter referred to as, a "touch sensor"), and where each input key is programmed with a unique key identifier (hereafter referred to as a, "key id"). It will be appreciated that the example touch sensor may include any suitable touch-like input key, including a proximity sensor, voice recognition, etc., and need not be limited to an input key that detects a physical contact between a user and the input key. In one embodiment, the universal controlling device 102, comprises a dome switch that is located beneath and is coupled to the capacitive input key structure that when compressed, such as when the user presses the dome and the dome is collapsed, provide the user with positive tactile feedback.

Generally, the STB 108 and the streamer 110 are connected to a smart TV 106, (hereafter referred to as "TV"), via an HDMI cable 112, may also be connected to a wireless router 114, may use a wireless signal 116 to communicate to a wide area network 118, and/or may operate to send data to a coupled remote server 120, coupled to a database 122.

As will be appreciated from the description that follows, the universal controlling device 102 is adapted to transmit one or more different wireless signals, such as signals 104 and 105, for reception by a corresponding plurality of intended target consumer electronic devices. Such transmission may use communication protocols such as Voice over IP (VoIP), IP, Smart Wave (S-WAVE), Wi-Fi, Bluetooth low energy (BLE), RF4CE, ZigBee, Z-wave, Infra-red, 6LoWPAN, Thread, Wi-Fi-ah, 2G, 3G, 4G, NB-IoT, 5G, NFC, RFID, SigFox, etc., as needed to communicate commands to the target consumer electronic devices.

The universal controlling device 102 may be operated by a user, using a finger to touch the input key on the universal controlling device 102 (as opposed to pressing the input key), which causes the universal controlling device 102 to send a first touch key id associated with the touched input key to a coupled smart device, such as the STB 108. The STB 108 receives the first touch key id and, in response, causes an electronic device template (e.g., a graphical user interface representation of a set of control and/or activity elements that are available for that particular consumer electronic device and which may be based on the current media content that the user is interacting with), to be displayed by a display device coupled to the STB 108, such as the TV 106. Similarly, an input key on the universal controlling device 102 may be pressed or otherwise suitably selected, such as for instance an elongated "touch", "hover-over", voice command, etc. In this example, the input key on the universal controlling device 102 is pressed via use of a dome structure beneath the capacitive key structure, for sending a second key id associated with the pressed input key to a coupled smart device. In some embodiments, the second key id may be different than the first key id.

In yet another embodiment, the second key id may comprise a key down event, a key press event, or any registered key value associated with the input key that was pressed by the user. For example, when the user touches an input key and then presses the same input key the universal controlling device 102 may send the first key id and the key down event and/or the registered key value to the smart device.

In one embodiment, the universal controlling device 102 may comprise a processor and processor-readable code for programming each input key with a unique key id when the universal controlling device 102 is first used. In this embodiment, each unique key id is a unique code that is not associated with the make, model, or product information associated with a consumer electronic device. Generally, infrared remote controls send digitally-coded pulses of infrared radiation designed by the specific manufacturer such as SONY®, SAMSUNG®, etc. to control functions such as power, volume, tuning, temperature set point, fan speed, or other features and different manufacturers of infrared remote controls use different protocols to transmit the infrared commands. In this embodiment, the unique signal comprising the key id may be in one or more forms of code such as ASCII, Binary, Oct, Dec, Hex or similar codes where each signal may be sent by the universal controlling device 102, using one or more communication protocols and where the unique code is not designed by a particular consumer electronic device manufacturer.

For example, the unique code may comprise a generic or dummy code which is independent of the make, model, etc. of the consumer electronic device. In some embodiments, at least some of the input keys on the universal controlling device 102 are not labeled which eliminates the need to look down at the universal controlling device 102 to control one or more consumer electronic devices.

In another embodiment, the universal controlling device 102 may comprise one or more accelerometers and/or one or more multiple-axis gyroscopes that when activated cause the universal controlling device 102 to determine a first orientation of the universal controlling device 102, where the first orientation corresponds to a first input key location. The first input key location is determined by the functional arrangement or key-meaning associations of the input keys of the universal controlling device 102. In this embodiment, the first orientation data and the key id of the key that the user touched are sent to the STB 108, for determining an orientation correction that is to be performed by the STB 108, for realigning each of the input keys with the first orientation. For example, the user may pick up the universal controlling device 102 in any orientation causing the gyroscope to send new orientation data to the processor of the universal controlling device 102 that causes the processor to perform an analysis using the previously stored orientation data and the new orientation data for the purpose of determining the change in location of the first input key. The universal controlling device 102 then remaps or otherwise reprograms each of the input keys to correspond with the orientation data. Such orientation compensation may be performed as described in U.S. Patent Application No. 2014/0218290, which is incorporated herein by reference in its entirety.

In one embodiment, the consumer electronic device templates may be provisioned to the STB 108 during a detection operation or provisioning operation by the server 120. In this embodiment, the controlling device 102 initiates a provisioning operation, i.e. at initial power on, that causes the STB 108, to perform a connected consumer electronic device detection operation. In some embodiments, the server 120, may receive configuration, (e.g. connected consumer electronic device information), from the STB 108, comprising a Universal Control Engine 100, (hereafter referred to as "UCE") via a provisioning process which is described in further examples below.

In another example, a smart device, in a cooperative operation with the universal controlling device 102 and the server 120, is configured in a provisioning process to enroll each consumer electronic device located in the user's home and detected by the smart device, such as a learning operation, and which associates a consumer electronic device to a consumer electronic device template.

Figure 2A:
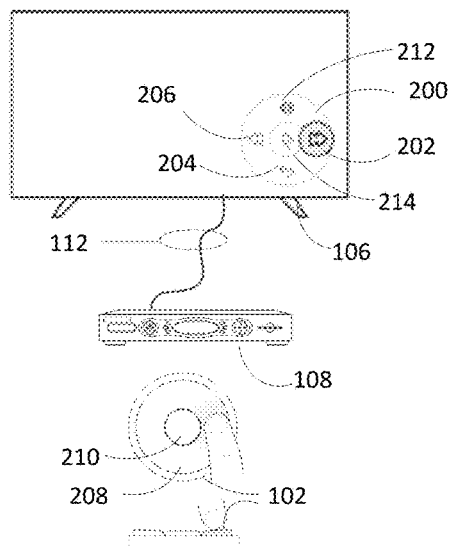
FIG. 2A is an illustrative example of using a universal controlling device for controlling a set top box while watching TV.

FIG. 2A is an illustrative example of an embodiment for using the universal controlling device 102 for controlling the TV 106 when the TV 106 is controlled by the STB 108. In this embodiment, the universal controlling device 102 comprises a circular touchpad 208 with a centered key 210 disposed in the center of the circular touchpad 208. The circular touchpad 208 may be considered to be an input key of the universal controlling device 102. The STB 108 provides TV content to the TV 106 typically over the cable 112, such as an HDMI cable. Both the TV content and the sound volume of the TV 106 content may be controlled by the STB 108 via the cable 112. When a user touches either the circular touchpad 208 or the circular key 210 while watching the TV 106, the universal controlling device 102 transmits a first key id, indicating that the user has touched either the circular touchpad 208 or the centered key 210. The STB 108 receives the first key id and, in response, selects a first consumer electronic device template 200 from a number of consumer electronic device templates stored in memory (or retrieved from a remote source, such as the remote server 120) and causes the first consumer electronic device template 200 to be displayed by the TV 106. In this example, the first consumer electronic device template 200 comprises a set of graphical elements 202, 204, 206, 212, and 214. In some embodiments, the set of graphical elements 202 may resemble the input keys of a traditional universal remote control, comprising graphical elements representing navigation commands such as fast forward 202, back/return 204, fast reverse 206, information 212, and play/pause 214 as needed for the desired operation.

While illustrated as a circular shape, it is to be understood that other consumer electronic device templates may include, but need not be limited to, various geometric shapes which may align to a particular shape of input key layout (e.g., triangular, squared, etc.) and input key location of the universal controlling device 102.

As the user moves his or her finger around the circular touchpad 208, the universal controlling device 102 transmits key ids corresponding to different areas of the circular touchpad 208, and the STB 108 causes corresponding graphical elements displayed on the TV 106 to become highlighted, shaded, or otherwise enhanced. For example, in FIG. 2 A, the user's finger is touching the right area of the circular touchpad 208, causing the fast-forward graphical element 202 to become highlighted, shaded, or otherwise enhanced. If the user presses down on the example circular touchpad 208 when one of the corresponding graphical elements are highlighted corresponding to the circular touchpad 208, i.e., the fast forward element 202, the back/return element 204, the fast reverse element 206, the information element 212, or the play/pause element 214, the universal controlling device 102 transmits a second key id to the STB 108, and the STB 108, in response, causes one or more predetermined actions to occur in association with the second key id, such as to alter the appearance of the selected graphical element on the TV 106 and either fast forward TV content, fast reverse TV content, rewind the TV content by 30 seconds, or cause information regarding the TV content to be displayed on the TV 106.

Figure 2B:
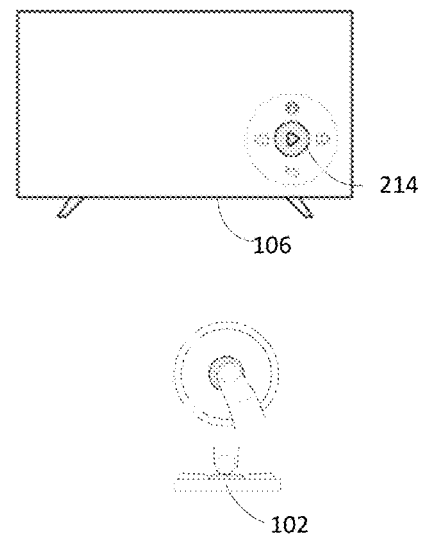
FIG. 2B is an illustrative example of how a graphical element is highlighted when the user touches (but not presses) a centered key.
Figure 2C:
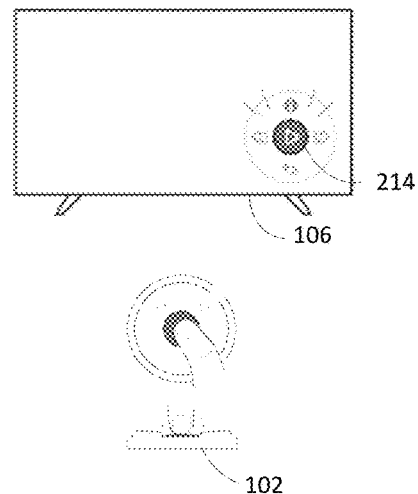
FIG. 2C is an illustrative example of how the set top box alters the appearance of play/pause graphical element when the user presses the centered key.

Continuing the example from FIG. 2A and assuming the user pressed an area of the circular touchpad 208 to rewind the TV content, FIG. 2B illustrates how the play graphical element 214 is highlighted when the user touches (but not presses) the centered key 210. FIG. 2C illustrates how the STB 108 alters the appearance of the play/pause graphical element 214 when the user presses the centered key 210. Also, the STB 108 may cause the first consumer electronic template 200 to be removed from view on the TV 106 while further stopping the rewind function and providing the TV content to the user at normal speed.

Figure 3A:
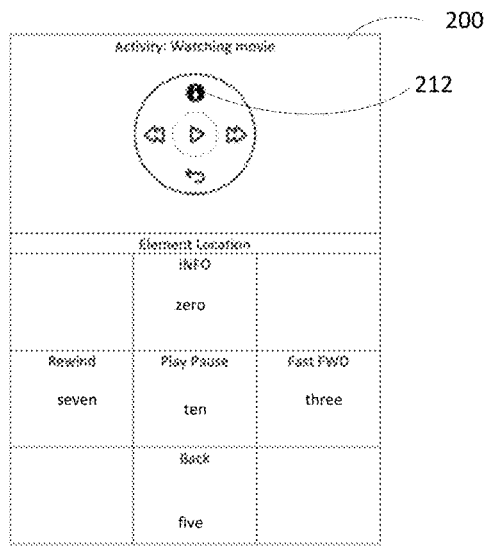
FIG. 3A is an illustrative example of a consumer electronic device template, displayed by a smart device when a user is watching a movie.

FIG. 3A is an illustrative example of an embodiment of a consumer electronic device template, displayed by a smart device when a user is watching a movie. In this embodiment, the consumer electronic device template 200, of FIG. 2A, represents a set of control and/or activity elements that are available for a source of the movie, such as a DVD player, a ROKU® brand media streamer, etc. The consumer electronic device template 200 may be stored in a memory of the source of the movie and/or a "master" smart device, such as the STB 108 and displayed by the source of the movie or the master smart device when a user touches an input key on the universal controlling device 102. In another embodiment, the templates may be stored on the remote server 120 and accessed over the wide-area network 118. The term "master" smart device may refer to a central consumer electronic device which serves as a source of media content to consumer electronic devices such as TV's, speakers, etc. The master smart device typically comprises wired or wireless input ports to receive entertainment content from a variety of sources, such as DVD players, media streaming devices such as a ROKU® brand media streamer, STBs, cable TV sources, satellite TV dishes, gaming consoles, etc. A typical master smart device may comprise a YAMAHA® brand RX-A720 AVENTAGE® receiver, a COMCAST® brand STB, etc.

In the embodiment of FIG. 3A, the consumer electronic device template 200 for the activity of the user watching a movie comprises an "Information" graphical element 212 associated with a key press of an input key location "0" on the universal controlling device 102, a "Fast Forward" graphical element associated with an input key location "3" on the universal controlling device 102, a "Back" graphical element associated with an input key location "5" on the universal controlling device 102, a "Rewind" graphical element associated with an input key location "7" on the universal controlling device 102, and a "Play/Pause" graphical element associated with an input key location "10" on the universal controlling device 102.

Figure 3B:
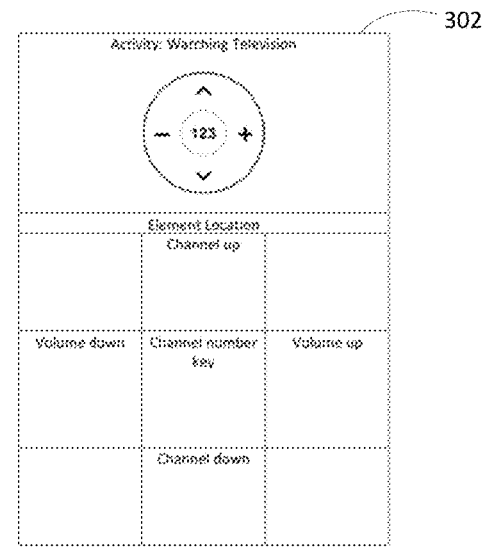
FIG. 3B is an illustrative example of a consumer electronic device template for the activity of watching the TV.

FIG. 3B is an illustrative example of another embodiment of a consumer electronic device template for the activity of watching the TV. In this embodiment, the consumer electronic device template 302, represents a set of graphical elements that are displayed after a user touches a key on the universal remote controller 102 when the user activity is "Watching Television". Similarly, a "Channel up" graphical element is associated with an input key location "0" on the universal controlling device 102, a "Volume up" graphical element is associated with an input key location "3" on the universal controlling device 102, a "Channel down" graphical element is associated with an input key location "5" on the universal controlling device 102, a "Volume down" graphical element is associated with an input key location "7" on the universal controlling device 102, and a "Channel number graphical element is associated with an input key location "10" on the universal controlling device 102.

Figure 3C:
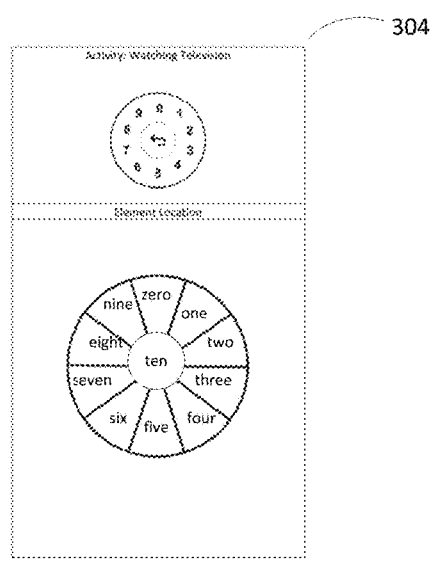
FIG. 3C is an illustrative example of another consumer electronic device template.

FIG. 3C is an illustrative example of yet another embodiment of a consumer electronic device template. In this embodiment, the consumer electronic device template 304, represents a set of graphical elements when the user activity is "Watching Television", where the user presses the input key location ten (e.g. the Channel number key), and a second set of graphical elements are determined by the STB 108, to display in the TV 106. The second set of graphical elements are associated with one or more input key locations on the universal controlling device 102. In this embodiment, input key locations "0" through "10" map to the channel numbers "0" through "9" and an input key location "10" maps to the "back" function. In some embodiments, the consumer electronic device template 200 may comprise, two or more layers of associated sets of graphical elements.

Figure 4:
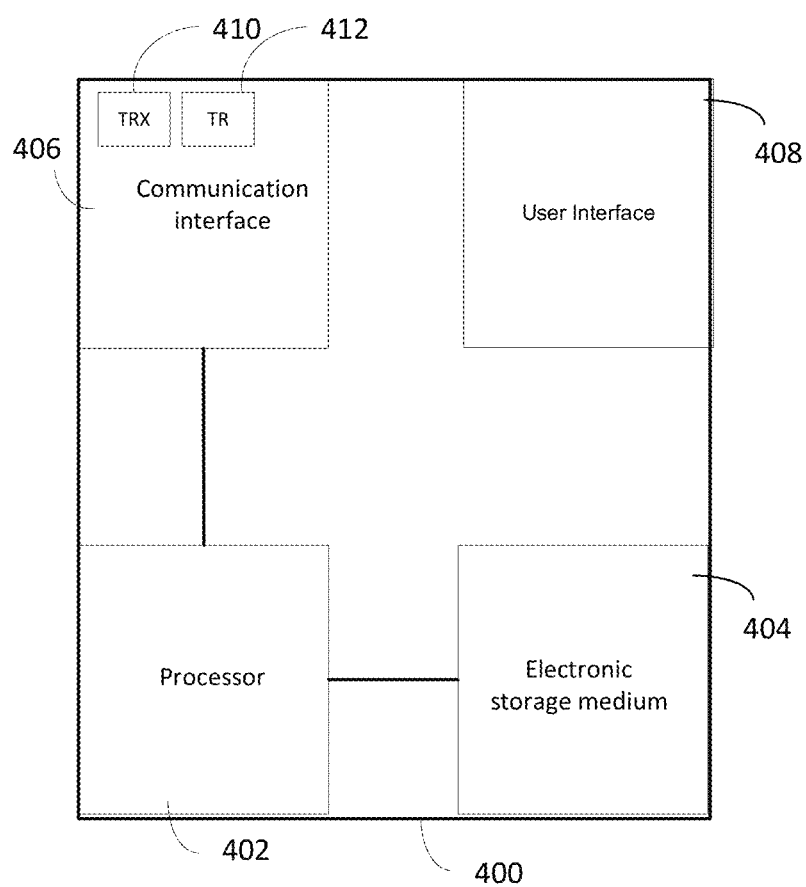
FIG. 4 is an example functional block diagram of the universal controlling device shown in FIG. 1, for controlling one or more consumer electronic devices.

FIG. 4 is a functional block diagram 400 of one embodiment of the universal controlling device 102 as shown in FIG. 1, for controlling one or more consumer electronic devices. The controlling device 102, in this example, comprises a processor 402, an electronic storage medium 404, a communication interface 406, a user interface 408, at least one transceiver 410, and at least one transmitter 412.

The processor 402 may be configured to provide general operation of the controlling device by executing processor-executable instructions stored in the electronic storage medium 404, for example, executable code. The processor 402 typically comprises a general-purpose microprocessor specifically adapted for use in the controlling device 102, although any one of a variety of microprocessors, microcomputers, and/or microcontrollers may be used alternatively, chosen based on factors such as computing power, cost, size, etc.

The electronic storage medium 404 comprises one or more information storage devices such as ROM, RAM, Flash, other type of electronic, optical or mechanical electronic storage medium device, or any combination thereof. The electronic storage medium 404 may be used to store processor-executable instructions for operation of the controlling device 102. It will also be appreciated that some or all of the illustrated electronic storage medium may be physically incorporated within the same IC chip as the processor 402.

As will be understood by those skilled in the art, some or all of the electronic storage medium 404 may store a plurality of unique key ids, each of the unique key ids associated with a particular input key of the universal controlling device 102.

The communication interface 406 comprises one or more data interface circuitry, such as well-known Ethernet, Wi-Fi, RF4CE, Bluetooth, or USB circuitry, that allows wireless communication between the universal controlling device 102, and the consumer electronic devices, and in some embodiments, between the universal controlling device 102 and a smart device or the wireless router 114 for communication therewith and the server 120, via the wide-area network 118. In one embodiment, the communication interface 406 comprises one or more data interface circuitry, such as at least one transceiver 410 and at least one transmitter 412, that allows communication between coupled smart devices. In this embodiment, the transceiver 410 may support a first wireless protocol which is used to communicate with a first smart device and the transmitter 412 may support a second wireless protocol which is used to communicate with a second smart device for providing key ids to each of the smart devices.

The user interface 408 comprises a user input device, for allowing a user to control operations of the universal controlling device 102. The user input typically comprises at least one or more input keys or mechanical keys for allowing a user to enter commands or information into the universal controlling device 102.

It should be understood that the functional blocks may be coupled to one another in a variety of ways other than which is shown in FIG. 4 and that not all functional blocks necessary for operation of the universal controlling device 102 are shown, such as a power supply, a microphone, one or more accelerometers, a multiple-axis gyroscope, a variety of other transceivers and transmitters each comprising a different wireless protocol, for purposes of clarity.

Figure 5:
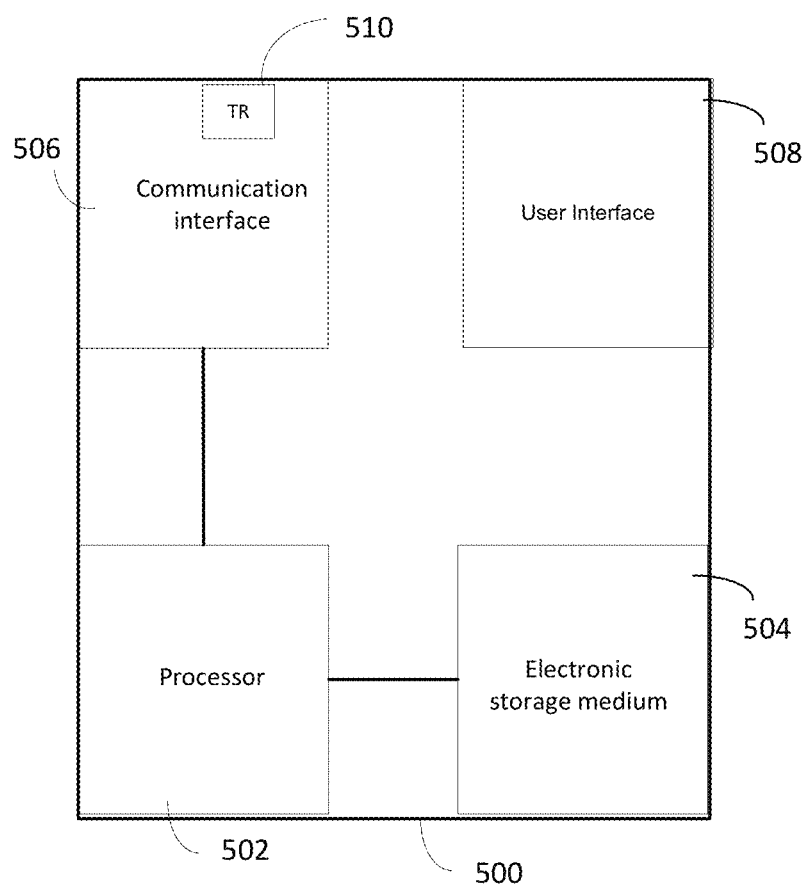
FIG. 5 is an example functional block diagram the smart device as shown in FIG. 2, for controlling one or more consumer electronic devices.

FIG. 5 is a functional block diagram 500 of one embodiment of a smart device as shown in FIG. 1, for controlling one or more consumer electronic devices.

In this embodiment, the smart device comprises a processor 502, an electronic storage medium 504, a communication interface 506, an optional user interface 508, and a transmitter/transceiver 510. It should be understood that the functional blocks may be coupled to one another in a variety of ways other than which is shown in FIG. 5 and that not all functional blocks necessary for operation of the smart device are shown, such as a power supply, a variety of other transceivers and transmitters each comprising a different wireless protocol for purposes of clarity.

The processor 502 is configured to provide general operation of a smart device by executing processor-executable instructions stored in the electronic storage medium 504, for example, executable code. The processor 502 typically comprises a general-purpose microprocessor, such as an INTEL® CORE™ I7 brand or an AMD K10 brand microprocessor, although any one of a variety of microprocessors, microcomputers and or microcontrollers may be used alternatively, chosen based on factors such as computing power, cost, size, etc.

The electronic storage medium 504 comprises one or more information storage devices such as ROM, RAM, Flash, other type of electronic, optical or mechanical electronic storage medium device, or any combination thereof. The electronic storage medium 504 may be used to store processor-executable instructions for operation of the smart device. It will also be appreciated that some or all of the illustrated electronic storage medium may be physically incorporated within the same IC chip as the processor 502.

As will be understood by those skilled in the art, some or all of the electronic storage medium 504 may store instructions or data that is particular to each type of smart device to be controlled. For example, instructions for the STB 108 may comprise instructions to receive television programming via the communication interface 506, may display one of the television programs, such as a movie, and display graphical elements 202, on a display, in accordance with the key ids received from the universal controlling device 102. The electronic storage medium 504 may additionally store a number of consumer electronic device templates 200, each one corresponding to a particular consumer device that may be operating at a user's home.

The communication interface 506 comprises one or more data interface circuitry, such as the transmitter/transceiver 510, Ethernet, Wi-Fi, RF4CE, Bluetooth, or USB circuitry, that allows digital communication, between the smart device and other coupled smart devices, the smart device and the universal controlling device 102, via a local area network provided by the wireless router 114, as well as between the smart device and the server 120, via the wide-area network 118. In this embodiment, the transmitter/transceiver 510 may support a wireless protocol, which is used to receive the key ids from the universal controlling device 102, may decode, compress or perform other operations as necessary for displaying the graphical element 202, in a display device.

The user interface 508 comprises a user input device and/or a user output device, for allowing a user to control operation of the smart device. The user input typically comprises one or more pushbuttons, keys, a touchscreen display, etc. for allowing a user to enter commands or information into the smart device. The user output device typically comprises a display screen, a touchscreen display, lights, amplified sound bars, etc. for presenting media content to a user as desired/needed.

It should be understood that the functional blocks may be coupled to one another in a variety of ways other than which is shown in FIG. 5 and that not all functional blocks necessary for operation of a smart device are shown, such as a power supply, a variety of other transceivers and transmitters each comprising a different wireless protocol, for purposes of clarity.

Figure 6:
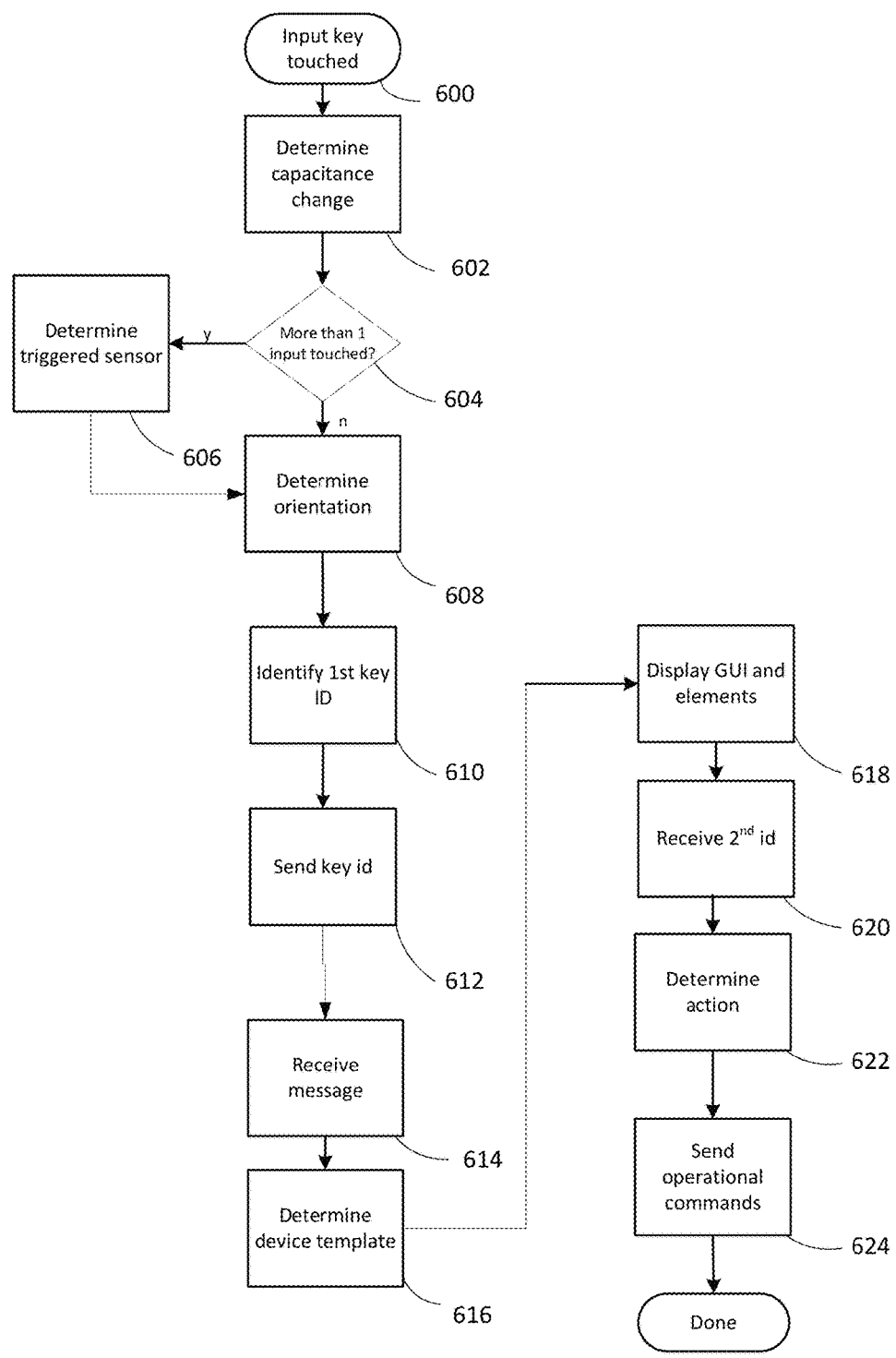
FIG. 6 is an example flow diagram for a method for controlling one or more consumer electronic devices, performed by a smart device in cooperation with a universal controlling device.

FIG. 6 is a flow diagram for a method for controlling one or more consumer electronic devices, performed by a smart device in cooperation with a universal controlling device. The method is implemented by the processor 502 located within a smart device, such as the STB 108, by executing processor-executable instructions stored in the electronic storage medium 504. It should be understood that in some examples, not all of the steps shown in FIG. 7 are performed and that the order in which the steps are carried out may be different. It should be further understood that some minor method steps, which would be known to those of ordinary skill in the art, have been omitted for purposes of brevity.

At a block 600, a user of the universal controlling device 102 touches an input key on the universal controlling device 102, as part of the user interface 408. The input key comprises a switch that is activated when pressed, as well as a touch sensor to determine when the key is touched. In response, the touched input key provides a signal to the processor 402 indicative of a particular key location that was touched. In another embodiment, the processor 402 monitors some or all of the input key locations and associated touch sensors to determine when one of the input keys exhibits a changed characteristic as a result of the user touching one of the input key locations, such as the capacitance of a touch sensor.

At a block 602, the in response to the user touching one of the input key locations, the processor 402 determines which touch sensor exhibited a change in characteristic. In one embodiment, the processor 402, determines which input key location was touched by determining a change in capacitance associated with one or more of the touch sensors.

At a block 604, the processor 402 receives a first and a second data from a first and a second touch sensor.

At a block 606, the processor 402 determines if one or more touch sensor signals were received, via the user interface 408. In one embodiment, the processor 402 receives a first data from a first touch sensor and may receive a second data from a second touch sensor where the second data may comprise a higher increase of the parasitic capacitance to ground value than the parasitic capacitance to ground value of the first data. In this embodiment, the second data is utilized to determine, by the processor 402, that the higher increase of the parasitic capacitance to ground represents that the user is touching the second input key location and not the first input key location. In one embodiment, the processor 402 receives an altered value of the mutual coupling between row and column electrodes to determine the input key location that the user is touching.

In one embodiment, at a block 608, the processor 402 determines a first orientation data of the universal controlling device 102, where the first orientation data corresponds to a first input key location on the universal controlling device 102 as described in FIG. 1. In one example, the processor 402 may receive orientation data from one or more accelerometers and/or one or more multiple-axis gyroscope where the first orientation data corresponds to a first input key location. It is to be understood that while orientation sensors are described as an accelerometer and a multiple-axis gyroscope orientation sensors may include, but need not be limited to, any sensor type that is capable of detecting a change in alignment of the universal controlling device 102, depending on the direction that the universal controlling device 102, is held, and/or, generally, any sensor that is also capable of communicating information with controlling type devices and/or other smart devices.

At a block 610, the processor 402, determines a first key id associated with a first input key that was touched by retrieving a first key id from the memory 404. For example, a user of the universal controlling device 102 may touch the first input key location on the universal controlling device 102 (as opposed to pressing the input key), which at a block 612, causes the processor 402 to transmit the input key id and, in one embodiment, orientation data via the transmitter/transceiver 410 and/or 412, to the smart device, in this case the STB 108.

At a block 614, the processor 502 of the STB 108 receives the first key id via the transmitter/transceiver 510 from the universal controlling device 102. In one embodiment, the processor 502 may also receive orientation data, via the transmitter/transceiver 510, from the universal controlling device 102. In this embodiment, the universal controlling device 102, provisions the processor 502, with orientation data and causes the processor 502, to determine a first orientation of the universal controlling device 102. In response to the processor 502, determining a first orientation, the processor 502, sends key id reprogramming instructions, via the communication interface 508, to the universal controlling device 102, where the universal controlling device 102, in real time, reprograms the unique key ids for each input key location to align with a first orientation of the universal controlling device 102. For example, the universal controlling device 102, may include more than one sensors that detect that the user is holding the universal controlling device 102, with the user's right hand. When the user picks up the universal controlling device 102, the universal controlling device 102 sends the orientation data to the processor 502, where the processor 502, then determines that the input key located furthest from the user's hand in the Y-axis is the top most input key and sends, via use of the communication interface 508, reprogramming instructions to the universal controlling device 102. Similarly, all input keys on the universal controlling device 102, may be reprogrammed based on the orientation of the universal controlling device 102.

At a block 616, the processor 502, determines a first consumer electronic device template 200 from a plurality of consumer electronic templates stored in the electronic storage medium 504, the first consumer electronic device template comprising a set of graphical elements 202, where each graphical element 202 is associated with an action of a particular consumer electronic device or smart device. In another embodiment, the plurality of consumer electronic templates are stored remotely, for example at the remote server 120.

At a block 618, the processor 502, transmits, via the communication interface 506, a set of the graphical elements 202 to a display device such as the TV 106, in some embodiments, via use of the HDMI cable 112 connected to the STB 108. In another embodiment, the graphical elements 202 are displayed on a display device associated with the smart device that is in communication with the universal controlling device 102. For example, the TV 106 may be in direct communication with the universal controlling device 102. the processor 502 within the TV 106 may display the graphical elements 202 (i.e., the selected electronic consumer device template) on the display of the TV 106.

At a block 620, the processor 502 receives a second key id via the transmitter/transceiver 510 from the universal controlling device 102, representative of an input key on the universal controlling device 102 that was pressed by the user. For example, an input key on the universal controlling device 102 may be pressed, via use of a dome structure beneath the capacitive key structure, for sending a second key id associated with the pressed input key to the STB 108. In some embodiments, the second key id may be different than the first key id.

At a block 622, the processor 502 determines an action associated with the second input key, based on the particular consumer electronic device template presently displayed to the user in the first graphical element 202. For example, when a TV template is being displayed and the second key id corresponds to a user pressing a particular area of the circular touchpad 208, the processor 502 may determine that a fast-forward function is desired by the user. When a different consumer device template is displayed and the same second key id is received, a different function may be invoked, such as to pause content currently being displayed by a ROKU® brand media streamer, for example. In one embodiment, the second key id may comprise a key down event, a key press event or any registered key value associated with the input key that was pressed by the user.

At a block 624, the processor 502, sends tone or more operational commands associated with one of the actions, where the operational commands are in conformity with a communication protocol used by a particular consumer electronic device associated with the template, to the active electronic consumer device for executing the operational commands. In some embodiments, an operational command may comprise a macro operation (e.g. two or more operational commands that may be executed by one or more consumer electronic devices).

In some embodiments, a real-time status/content detection operation is performed by a smart device comprising a Universal Control Engine, and the detected available media content is used to determine which consumer electronic device template to display. In these embodiments, the functionality for gathering the identification of available media content from detected smart devices or detected consumer electronic devices located at an end-user's home may be performed as described in U.S. patent application Ser. No. 15/647,947 filed on Jul. 12, 2017 and which is incorporated herein by reference in its entirety.

In another embodiment, the STB 108, may perform a detection operation, such as a detect/request the active source/sink/port on the audio-video/communications bus status request, to detect an active HDMI input of an active consumer electronic device. The STB 108 then determines a consumer electronic device connected to the active HDMI input and, in turn, determines the consumer electronic device template 200 associated with the active consumer electronic device.

For example, when the universal controlling device 102 is picked up, tapped or moved by a user and the user's finger touches an input key on the universal controlling device 102, the universal controlling device 102 sends a key id to the STB 108, where in response to receiving the key id, the STB 108 determines a particular one of the consumer electronic device templates 200 that is associated with a consumer electronic device that is presently determined to be active by the detection operation discussed above. The STB 108 then selects the consumer electronic device template 200 based on the active consumer electronic device and sends the elected consumer electronic device template to the TV 106, via a wired or wireless communication protocol. The TV 106, in response to receiving the selected consumer electronic device template, displays the template, indicative of the available controls and/or activities available to the user for selection. Such activities may comprise for example, "Play", "Pause", "Fast-forward", "Back" and "Rewind" when the user is watching a movie or when the user is listening to a music streaming device. In this example, the selected consumer electronic device template comprises graphical elements related to the TV 106 and may be as highlighted or shaded when the user has touched an associated input key. In this embodiment, a key touch is used for navigation of the set of graphical elements.

In one embodiment, the consumer electronic device templates 200, may be stored locally on the STB 108, or may be automatically provisioned to the STB 108, by the coupled server 120 having access to the database 122, via use of the wide area network 118.

In one embodiment, the detection operation performed by the STB 108 comprises sending signals to one or more smart devices and/or consumer electronic devices discovered during the discovery process described earlier herein. Such a discovery process causes the detected devices to provide their device information, such as EDID, CEC, vendor name, device type, device status, installed apps, current media content being played on the device, media content logos, Infoframe, SSDP, MDNC, IP mDNS Service List, supported wireless protocols such as VoIP, IP, Smart Wave (S-WAVE), Wi-Fi, Bluetooth low energy (BLE), RF4CE, ZigBee, Z wave, Infra-red, etc., to a requesting smart device. For example, the detection operation or provisioning process may be used to determine smart devices and/or consumer electronic devices comprising the same operational capabilities. Further details of such device detection may be found in U.S. Pat. Nos. 8,812,629, 8,558,676, 8,659,400, 8,830,074, 8,896,413, 9,437,105, 9,449,500 and 9,019,435 all of which are incorporated herein by reference in their entirety.

In any of the examples, the functionality for gathering the identification of smart devices information from smart devices located at an end-user's home may be performed by the Universal Control Engine (UCE) 100 as described in U.S. Pat. No. 9,215,394 which patent is incorporated herein by reference in its entirety. In one example, when a smart device, comprising the UCE 100 is initially powered on, an automatic detection operation or provisioning process may be initiated for identifying or detecting consumer electronic devices and/or smart devices on the same local network as the smart device containing the UCE 100. Alternatively, the detection operation may be initiated by an input key press on the universal controlling device 102. Such a provisioning process is described in U.S. Pat. No. 9,307,178 which is also incorporated herein by reference in its entirety.

It is to be understood that the universal controlling device 102, as shown, FIG. 1 may include a plurality of other functions such as motion sensor-enabled capabilities, hand-gesture recognition and may include the capability to display images, such as logos, alphanumeric text, etc. Such controlling devices may cooperate with one or more apps, to control a smart device. Furthermore, the universal controlling device 102, may cooperate with one or more smart devices each comprising a computing client, such as in a client-server-model to provision and/or to control a smart device.

In one embodiment, the universal controlling device 102, having an associated control app and coupled to the server 120, sends a request to a smart device, comprising the associated app, to perform a local operation to dynamically scan the local-area network for connected smart devices when an input key on the universal controlling device 102, is touched or pressed by the user, where the app operates as an intermediary device for communications between the universal controlling device 102, and the smart device. In this embodiment, the app may receive instructions from the smart device to reprogram the unique key ids on the universal controlling device 102, of each of the input keys to align with the first orientation of the universal controlling device 102.

In another embodiment, the universal controlling device 102, comprises mechanical keys for allowing a user to enter commands or information into the universal controlling device 102. In this embodiment, the mechanical keys, are without key labels and may be arranged in a row and column key layout, such as in a four key by four key matrix keypad.

While illustrated as the TV 106, the STB 108, and the streamer 110, it is to be understood that smart devices may include, but need not be limited to, various televisions, VCRs, DVRs, DVD players, cable or satellite converter set-top boxes, amplifiers, CD players, game consoles, home lighting, smart wireless hubs, drapery, fans, HVAC systems, personal computers, wearable health monitoring devices, or, generally, any consumer product capable of communicating with controlling type devices and/or other smart devices. In other embodiments, smart devices are not internet capable, but are capable of communicating with consumer electronic devices via wired or wireless means.

While described as an active HDMI input, it is to be understood that an active input includes any active source/sink/port on the audio-video/communications bus status either wired or wirelessly connected to the smart device which initiated the status request.

It is also to be understood that the universal controlling device 102, may be partially configured at a factory with one or more key ids preinstalled. When initially powered on, the universal controlling device 102, may be configured to automatically communicate with a predetermined smart device, such as the STB 108, such as when the universal controlling device 102 and the STB 108 are paired with each other out of the-box. Similarly, an automatic pairing operation may be performed when the end user presses a first key, on the universal controlling device 102, for initiating a communication with the STB 108.

While various concepts have been described in detail, it will be appreciated by those skilled in the art that various modifications and alternatives to those concepts could be developed in light of the overall teachings of the disclosure. Further, while described in the context of functional modules and illustrated using block diagram format, it is to be understood that, unless otherwise stated to the contrary, one or more of the described functions and/or features may be integrated in a single physical device and/or a software module, or one or more functions and/or features may be implemented in separate physical devices or software modules. It will also be appreciated that a detailed discussion of the actual implementation of each module is not necessary for an enabling understanding of the invention. Rather, the actual implementation of such modules would be well within the routine skill of an engineer, given the disclosure herein of the attributes, functionality, and inter-relationship of the various functional modules in the system. Therefore, a person skilled in the art, applying ordinary skill, will be able to practice the invention set forth in the claims without undue experimentation. It will be additionally appreciated that the particular concepts disclosed are meant to be illustrative only and not limiting as to the scope of the invention which is to be given the full breadth of the appended claims and any equivalents thereof.

All patents cited within this document are hereby incorporated by reference in their entirety.

What is claimed is:

1. A universal controlling device for controlling one or more consumer electronic devices, comprising:
   a plurality of input keys for receiving user input;
   an electronic storage medium having processor-readable code stored therein and storing a plurality of unique key ids, each of the unique key ids correspondingly associated with a particular one of the plurality of input keys of the universal controlling device;
   a communication interface for sending the unique key ids to a smart device; and
   a processor, coupled to the electronic storage medium, the input keys, and the communication interface, for executing the processor-readable code that causes the universal controlling device to:
      determine, by the processor, that a first input key was touched by a user;
      in response to the processor determining that the first input key was touched, send, by the processor, via the communication interface to the smart device, a first unique key id associated with the the first input key that causes a consumer electronic device template associated with a first consumer electronic device to be displayed by the smart device, the consumer electronic device template comprising a set of graphical user interface elements, each graphical user interface element associated with a particular action of the consumer electronic device; and
      determine, by the processor, that a second input key was pressed; and
      in response to determining that the second input key was pressed, sending, by the processor via the communication interface, a second unique key id associated with the second key to the smart device, the second unique key id causing selection of a first graphical element from the set of graphical elements that causes the smart device to have the consumer electronic device perform the action associated with the first graphical element.

2. The universal controlling device as recited in claim 1, wherein at least some of the input keys comprise:
   a conductive key structure for entering a key command via a key press; and
   a touch sensor for determining a key touch.

3. The universal controlling device as recited in claim 1, wherein at least some of the input keys are not labeled.

4. The universal controlling device as recited in claim 1, further comprising:
   an accelerometer, coupled to the processor;
   wherein the processor-readable code further comprises instructions that causes the universal controlling device to:
      provide the processor with orientation information;
      cause the processor to determine a first orientation of the universal controlling device from the orientation information; and
      in response to the processor determining a first orientation of the universal controlling device, reprogram the unique key ids, by the processor, of each of the input keys to align with the first orientation.

5. The universal controlling device as recited in claim 1, further comprising:
   a multiple-axis gyroscope, coupled to the processor;
   wherein the processor-readable code comprises further instructions that causes the universal controlling device to:
      provide the processor with orientation information;
      cause the processor to determine a first orientation of the universal controlling device based on the orientation information;
      in response to the processor determining a first orientation of the universal controlling device, reprogram the unique key ids, by the processor, of each of the input keys to align with the first orientation.

6. A smart device, coupled to a universal controlling device, for controlling one or more consumer electronic devices, comprising:
   an electronic storage medium having processor-readable code stored therein and storing a plurality of consumer electronic device templates, wherein each template comprises a graphical representation of a set of actions available to a user to control a particular consumer electronic device, each graphical user interface element associated with one of the actions, and further for storing operational commands each associated with one of the actions, the operational commands in conformity with a protocol used by a particular consumer electronic device associated with the template;
   a communication interface for receiving an input from the universal controlling device; and
   a processor, coupled to the electronic storage medium and the communication interface for executing the processor-readable code that causes the smart device to:
      receive, by the processor via the communication interface, a first key id from the universal controlling device representative of an input key of the universal controlling device that was touched by the user;
      determine, by the processor, a first consumer electronic device template associated with the first key id from the plurality of consumer electronic device templates stored in the electronic storage medium, the first consumer electronic device template comprising a plurality of first graphical user interface elements associated with a first consumer electronic device;

cause, by the processor, the first consumer electronic device template to be displayed by a display device;

receive, by the processor via the communication interface, a second key id from the universal controlling device representative of an input key of the universal controlling device that was pressed by the user;

determine, by the processor, a first operational command associated with the second key id; and performing an action associated with the first operational command.

7. The smart device as recited in claim 6, wherein the processor-readable instructions further comprise instructions that cause the smart device to:

receive the consumer device templates, via a second communication interface, for local storage in the electronic storage medium, wherein the consumer device templates sent by a coupled remote server, via a wide area network, to the smart device.

8. The smart device as recited in claim 6, wherein the processor-readable instructions further comprise instructions that cause the smart device to:

receive the consumer device templates, via the second communication interface, for local storage in the electronic storage medium, wherein the consumer device templates are sent by a coupled cloud service, via a wide area network, to the smart device.

9. The smart device as recited in claim 6, wherein a second smart device receives the consumer device templates, via a second communication interface, for local storage in a second electronic storage medium from a coupled remote server via a wide area network, and wherein the processor-readable instructions further comprise instructions that cause the smart device to:

receive, via the communication interface, the consumer device templates from the second smart device, for local storage in the electronic storage medium.

10. The smart device as recited in claim 6, wherein the processor-readable instructions further comprise instructions that cause the smart device to:

receive the consumer device templates, via an app installed on a coupled second smart device, for local storage in the electronic storage medium, wherein the consumer device templates are sent by a coupled cloud service, via a wide area network, to the app installed on the second smart device.

11. The smart device as recited in claim 6, further comprising the display device.

12. The smart device as recited in claim 6, further comprising a display device wherein the display device resides on a consumer electronic device coupled to the smart device.

13. The smart device as recited in claim 6, wherein the processor-readable instructions further comprise instructions that cause the smart device to:

determine, by the processor, a first consumer electronic device template associated with the first key id from the plurality of consumer electronic device templates stored in the electronic storage medium, the first consumer electronic device template comprising a plurality of first graphical user interface elements associated with a first consumer electronic device wherein the consumer electronic device template is determined by the processor performing a detection operation.

14. A method for controlling one or more consumer electronic devices, performed by a smart device in cooperation with a universal controlling device, comprising:

receiving, by a processor, via a communication interface, a first key id from the universal controlling device representative of a first key on the universal controlling device that was touched by a user;

determining, by the processor, a first consumer electronic device template from a plurality of consumer electronic templates stored in a memory, the first consumer electronic device template comprising a set of graphical user interface elements, each graphical user interface element associated with an action of a particular consumer electronic device;

displaying the set of graphical user interface elements on a display device;

receiving, by the processor via the communication interface, a second key id from the universal controlling device, the second unique key id representative of a second key that was pressed by the user; and causing the consumer electronic device to perform an action associated with the second key id.

15. The method as recited in claim 14 wherein the action comprises sending operational commands to an active electronic consumer device.

16. The method as recited in claim 14, wherein the action comprises causing a change in content displayed by the smart device.

17. A system for controlling one or more consumer electronic devices comprising:

a universal controlling device comprising one or more input keys for receiving user input and for sending key ids to a smart device in response to receiving the user input, the key ids indicating a particular input key was touched or pressed by a user;

a smart device comprising a processor readable code that causes the smart device to perform steps comprising:

receiving, by a processor, via a communication interface, a first key id from the universal controlling device representative of a first key on the universal controlling device that was touched by a user;

determining, by the processor, a first consumer electronic device template from a plurality of consumer electronic templates stored in a memory, the first consumer electronic device template comprising a set of graphical elements, each graphical element associated with an action of a particular consumer electronic device;

displaying the set of graphical elements on a display device;

receiving, by the processor via the communication interface, a second unique key id from the universal controlling device, the second unique key id representative of a second key that was pressed by the user; and causing the consumer electronic device to perform an action associated with the second key id.

18. The system as recited in claim 17, wherein the smart device is coupled to a remote server.

19. The system as recited in claim 17, wherein the smart device is coupled to a cloud service.

* * * * *